(12) United States Patent
Jarzombek et al.

(10) Patent No.: US 12,539,735 B2
(45) Date of Patent: Feb. 3, 2026

(54) SYSTEMS AND METHODS OF PRIORITIZING TEMPERATURE CONTROL

(71) Applicant: Rivian IP Holdings, LLC, Plymouth, MI (US)

(72) Inventors: Clay Anton Jarzombek, Los Angeles, CA (US); Ajay Panekkad, Laguna Niguel, CA (US); Graham Lloyd Feltham, Irvine, CA (US); Michael Goertz, Belmont, CA (US); Aldrin Lenus Saldanha, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 536 days.

(21) Appl. No.: 18/148,641

(22) Filed: Dec. 30, 2022

(65) Prior Publication Data

US 2024/0217306 A1     Jul. 4, 2024

(51) Int. Cl.
*B60H 1/00* (2006.01)

(52) U.S. Cl.
CPC ....... *B60H 1/00742* (2013.01); *B60H 1/0073* (2019.05); *B60H 2001/00733* (2019.05)

(58) Field of Classification Search
None
See application file for complete search history.

(56) References Cited

U.S. PATENT DOCUMENTS

| | | | |
|---|---|---|---|
| 11,535,131 B1 * | 12/2022 | Feltham | B60N 2/5628 |
| 2023/0191873 A1 * | 6/2023 | Feltham | B60H 1/0073 701/36 |

* cited by examiner

*Primary Examiner* — Ko-Wei Lin
(74) *Attorney, Agent, or Firm* — Foley & Lardner LLP

(57) ABSTRACT

Systems and methods for prioritization temperature control within a vehicle are provided. A system can detect occupancy of a cabin of a vehicle in a first time interval. The system can determine, based on the occupancy, a climate control prioritization for the cabin and an energy storage system of the vehicle for heat exchange. The system can control heat exchange for the cabin and the energy storage system based on the climate control prioritization.

20 Claims, 6 Drawing Sheets

SYSTEMS AND METHODS OF PRIORITIZING TEMPERATURE CONTROL

INTRODUCTION

Vehicles can have air exchangers that can cause air to move.

SUMMARY

At least one aspect is directed to a system. The system can include a data processing system. The data processing system can include one or more processors coupled with memory to detect occupancy of a cabin of a vehicle during a first time interval. The data processing system can determine, based on the occupancy, a climate control prioritization for one of the cabin or an energy storage system of the vehicle for heat exchange. The data processing system can control heat exchange for the cabin and the energy storage system based on the climate control prioritization.

At least one aspect is directed to a method. The method can include detecting, by a data processing system including one or more processors coupled with memory, occupancy of a cabin of a vehicle in a first time interval. The method can include selecting, by the data processing system based on the occupancy, a prioritization control setting for one of the cabin or an energy storage system of the vehicle for heat exchange in the first time interval. The method can include controlling, by the data processing system, heat exchange for the cabin and the energy storage system based on the prioritization control setting.

At least one aspect is directed to an electric delivery vehicle. The electric delivery vehicle can include a proximity sensor to detect occupancy of a cabin of the electric delivery vehicle. The electric delivery vehicle can include a first heat exchanger configured to exchange heat with the cabin. The electric delivery vehicle can include a second heat exchanger configured to exchange heat with the energy storage system. The electric delivery vehicle can include a data processing system including one or more processors coupled with memory to detect, via the proximity sensor, the occupancy of the cabin in a first time interval. The data processing system can determine, based on the occupancy, a climate control prioritization for one of the cabin or an energy storage system of the vehicle for heat exchange. The data processing system can adjust, based on the prioritization, a first target for the first heat exchanger and a second target for the second heat exchanger to control heat exchange for the cabin and the energy storage system.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
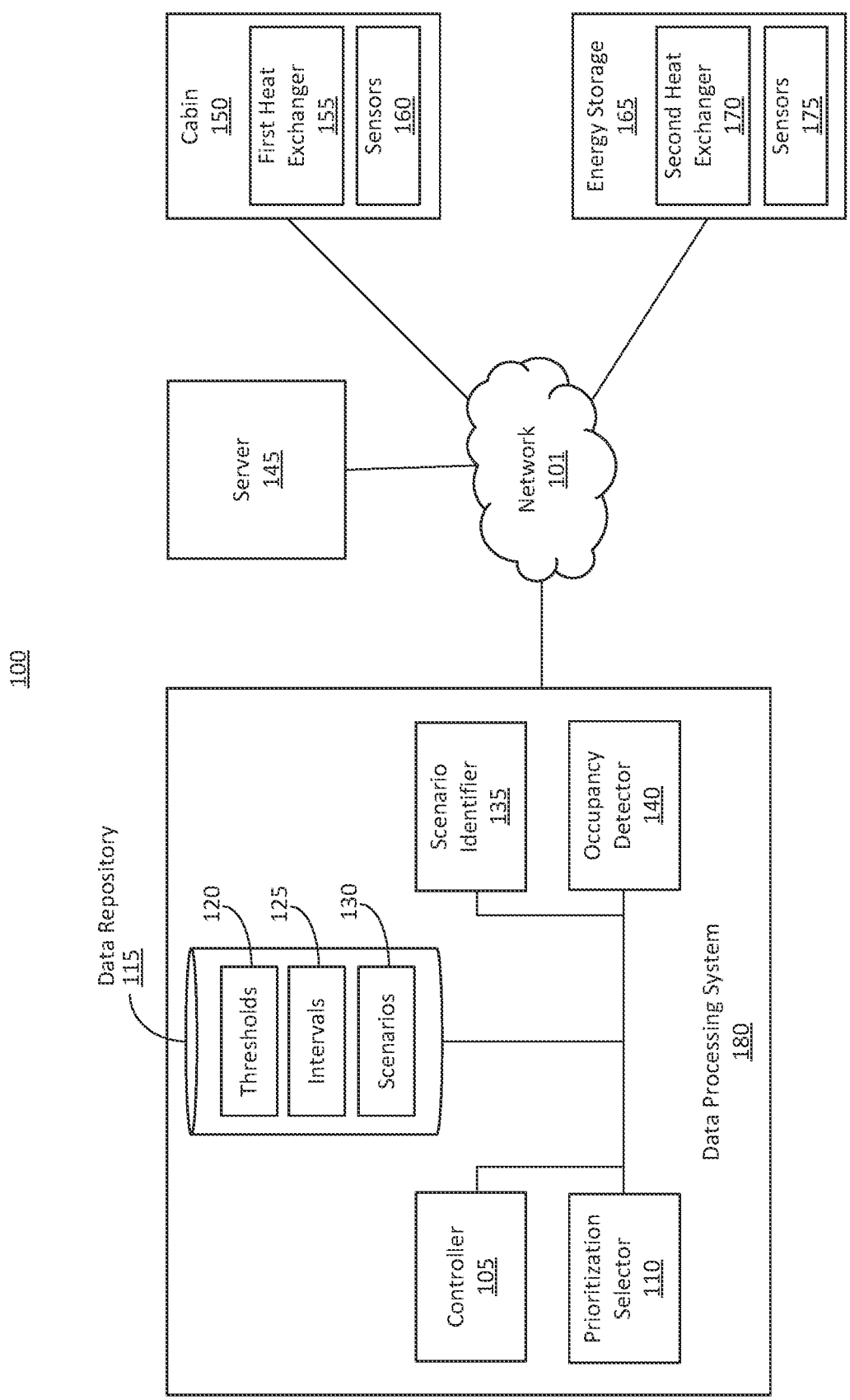
FIG. 1 depicts an example system for an air exchanger system within a vehicle.

Following below are more detailed descriptions of various concepts related to, and implementations of, methods, apparatuses, and systems of prioritizing temperature control. The various concepts introduced above and discussed in greater detail below may be implemented in any of numerous ways.

The present disclosure is directed to systems and methods of prioritizing temperature control. For example, the systems and methods of this technical solution can determine which vehicle compartment of an electric vehicle to prioritize for heat exchange. Vehicles can control the temperature or cool one or more compartments of the vehicle, such as the cabin or the energy storage compartment (e.g., battery). The vehicle can cool the energy storage compartment based on a temperature set point or target to maintain performance or functionality of the battery, and control the temperature of a cabin for the vehicle to maintain the comfort of the driver and passengers. Since drivers of electric delivery vehicles can frequently enter and exit the cabin, it can be challenging to efficiently maintain the cabin temperature and the battery temperature without unnecessary or wasted energy consumption nor battery utilization. This technical solution can efficiently maintain the temperature of the energy storage system during drive cycles without compromising cabin cooling capacity and occupant comfort. For example, a data processing system of this technical solution can use occupant detection to determine the appropriate heat exchanger targets to maximize cooling performance in the subsystem that benefits from the most cooling capacity. When the occupant is in the vehicle, this technical solution can shift priority away from the energy storage system (battery) and shift the priority towards the cabin to maximize user comfort. When the occupant is outside of the vehicle, this technology can shift the priority away from the cabin and towards the energy storage system to maximize battery cooling.

The disclosed solutions have a technical advantage of automatically addressing the prioritization of cabin and energy storage system heat exchange. Systems and methods of the disclosed solution can detect occupancy of a vehicle and prioritize, responsive to conditions, the cabin for air exchange. Conditions can include, for example, if the energy storage system is below a threshold temperature and if there is a request for cabin cooling. The present disclosure advantageously considers the occupant while also maintaining an adequate temperature for the functionality of the energy storage system.

In an illustrative example, a data processing system of this technical solution can identify a request to cool both a battery of the vehicle and a cabin of the vehicle (e.g., the temperatures of the battery and cabin can be greater than their respective temperature set points). The data processing system can determine a default or current cooling priority between the battery and the cabin (e.g., a default priority can be to prioritize cooling the battery over the cabin, or a default priority can be to prioritize cooling the cabin over the battery). Responsive to identifying the request to cool both the battery and the cabin, the data processing system can determine whether the cabin has been vacant for a time duration that is greater than or equal to a first time interval (e.g., 3 seconds). If the data processing system determines that the cabin has been vacant for more than 3 seconds, for example, the data processing system can determine to shift cooling priority to the battery, or prioritize cooling the battery over cooling the cabin. The data processing system can determine to prioritize cooling the battery over the cabin because the cabin has been vacant for more than 3 seconds.

If, however, the data processing system determines that the cabin has not been vacant for more than the first time interval, then the data processing system can determine whether the cabin has been occupied for a time duration that is greater than or equal to a second time interval (e.g., 0.5 seconds). For example, the data processing system can determine if the cabin has been occupied for more than 0.5 seconds. If the data processing system determines that the cabin has not been vacant for more than 3 seconds, and the cabin has been occupied for more than 0.5 seconds, then the data processing system can determine to shift cooling priority to the cabin. If, however, the data processing system determines that the cabin has not been vacant for more than 3 seconds, and the cabin has not been occupied for more than 0.5 seconds, then the data processing system can determine to keep the default cooling priority or not change the previous cooling priority established or set by the data processing system.

FIG. 1 depicts an example system 100 for controlling the air exchange of an electric delivery vehicle. System 100 can include a data processing system 180. The data processing system 180 can include a data repository 115. The data processing system 180 can include a controller 105. The data processing system 180 can include a prioritization selector 110. The data processing system 180 can include a scenario identifier 135. The data processing system 180 can include an occupancy detector 140. The data repository 115 can include thresholds 120, intervals 125, and scenarios 130. System 100 can include, interface with, access, or otherwise communicate with or via a network 101, server 145, cabin 150, or energy storage 165. Cabin 150 can include a first heat exchanger 155 or sensors 160. Energy storage 165 can include second heat exchanger 170 or sensors 175.

The system 100 can be used to prioritize and control the heat exchangers 155 and 170 of an electric delivery vehicle. Data processing system 180 can (through occupancy detector 140 and sensors 160 and 175) determine if there is an occupant of the vehicle. Responsive to that determination, the data processing system 180 can identify at least (through scenario identifier 135) a request to cool an occupied cabin 150 or an energy storage compartment 165 and as a result, prioritize (through the prioritization selector 110) either the cabin 150 or the energy storage 165 for heat exchange. Heat exchange may be referred to as "cooling" throughout the descriptions herein.

The data processing system 180 can be any system of hardware and software to store, transmit, control, receive, or display information about the system 100. The data processing system 180 can include data repository 115, controller 105, prioritization selector 110, scenario identifier 135, and occupancy detector 140. The data processing system 180 can coordinate and configure its subcomponents. The data processing system 180 can communicate via a network 101 with devices outside of the data processing system 180. The data processing system can include any computer or input device as described in reference to FIG. 6. Subcomponents of the data processing system 180 can communicate with each other. For example, prioritization selector 110 can communicate with controller 105 via CAN, LAN (local area network), Bluetooth, fiber optic cable, hardwired connection, or another communication medium known to those in the art. Subcomponents of the data processing system 180 can be located throughout the vehicle and outside of the vehicle. For example, data repository 115 can be located locally to the vehicle (such as within a computer of the vehicle) or can be located remotely from the vehicle (such as within an external computing device, not pictured) and accessed by at least network 101.

Data repository 115 can contain any information about the system 100 and can allow that data to be accessed by any components of the system 100. Data repository 115 can contain thresholds 120, intervals 125, and scenarios 130. The information contained in data repository 115 can be dynamic and can change periodically, via an input from a user, or via an update to the system, for example. Information in data repository 115 can be stored in any kind of memory, such as a cloud or hard drive for example. Data repository 115 can include, for example, random access memory (RAM), dynamic random access memory (DRAM), static random access memory (SRAM), error-correcting code (ECC), read only memory (ROM), programmable read only memory (PROM), or electrically erasable read only memory (EEPROM). Data repository 115 can be accessed at any time and by any component of system 100. For example, data repository 115 can be accessed by the system 100 at least periodically, in response to a change in occupancy of the vehicle, or in response to a temperature of the vehicle exceeding a threshold 120.

Thresholds 120 can be any limit, constraint, temperature, set point, or target which represents an upper or lower maximum or minimum to trigger an action by the system 100. An action of the system can be any of the functionalities of the system 100, such as detecting occupancy of the vehicle, updating the data repository 115, or prioritizing one of the cabin or the energy storage system for cooling. For example, thresholds 120 can be a temperature threshold which the energy storage 165 should not exceed, or thresholds 120 can be a time limit for which activation of a heat exchanger should not be under. Thresholds 120 can be stored in the data repository 115 and can be modified periodically, for example via a user request to cool the cabin, or via an automatic software update.

Intervals 125 can be any length, duration, period, or span denoting a time. Intervals 125 can be a plurality of intervals and can include a first interval and a second interval. Intervals 125 can be stored in data repository 115 and can be initiated by a user. For example, interval 125 can be initiated by a user sending a request to cool a cabin of the vehicle. Intervals 125 can be reset, for example, by a second user request, a system request, or periodically. Intervals 125 can, for example, be the duration of time between a first request to cool a cabin 150 and a second request to cool the energy storage system 165. Intervals 125 can further include an incrementing period of time of which the cabin is determined to be unoccupied. For example, intervals 125 can increment (e.g., by seconds or minutes) while the cabin is determined to be unoccupied or occupied.

Scenarios 130 can be any state, condition, or circumstance which prompts the system 100 to enact cooling (e.g., air exchange). Scenarios 130 can be detected by scenario identifier 135. Scenarios 130 can include conditions such as a request from a user or from the energy storage 165 to cool, or a temperature of either the cabin 150 or energy storage 165 exceeding a threshold 120 temperature. Scenarios 130 can be based on at least one or more conditions. Scenarios 130 can be stored in data repository 115 as a database, look up table, list, or other data structure. Scenarios 130 can correspond to a time interval 125. For example, a scenario 130 can correspond to a specific time between a first request to cool a cabin 150 and a second request to cool the energy storage system 165. Conditions of a scenario can include at least an interval 125, a detection of occupancy, a temperature of the cabin or of the energy storage compartment, or a user input. Each condition can be stored in conjunction with the scenario in the data repository 115.

Occupancy detector 140 can be any combination of hardware and software configured to detect an occupant of a vehicle. Occupancy detector 140 can communicate with sensors 160 and 175. Occupancy detector 140 can respond to a measurement from sensors 160 of the cabin 150. For example, occupancy detector 140 can respond to an indication from a proximity sensor of the cabin. The occupancy detector 140 responding can include the occupancy detector communicating (e.g., via the means described herein) with subcomponents of the data processing system 180. For example, the occupancy detector 140 can respond to a change in occupancy by communicating (e.g., wirelessly via communication protocols such as Bluetooth, Wifi, or CAN, or wired such as via fiber optic cables or hard copper lines) with the scenario identifier 135. Occupancy detector 140 can increment an interval 125 for which an occupant is within or outside of the vehicle. In some embodiments, occupancy detector 140 can detect the occupancy of the vehicle at a specific time interval. For example, if an interval of time since a first detection of occupancy has passed, the occupancy detector can detect the occupancy of the vehicle a second time. In this manner, occupancy can be checked periodically. Occupancy detector 140 can be included within the data processing system 180 and can be located within the cabin of the vehicle, a computer of the vehicle, or remote from the vehicle.

Scenario identifier 135 can be any combination of hardware and software configured to determine a scenario 130 of the vehicle. Scenario identifier 135 can receive requests from the user or the system 100. A request can be, for example, an input from the user (such as from an input device as described herein with reference to FIG. 6), an indication from the system 100 responsive to exceeding a threshold 120, or an indication from the occupancy detector 140 that an occupant has entered the vehicle. An input from a user can be entered via an input device, such as input device 630 described in reference to FIG. 6 below. Responsive to receiving a request, the scenario identifier 135 can determine a scenario of the vehicle. A scenario can be determined by the scenario identifier 135 responsive to a plurality of requests. For example, an occupant entering the vehicle and a temperature of the energy storage 165 exceeding a threshold 120 can indicate a corresponding scenario 130.

Prioritization selector 110 can be any combination of hardware and software configured to prioritize a heat exchanger or a plurality of heat exchangers (e.g., first heat exchanger 155 or second heat exchanger 170) of a vehicle responsive to at least the scenario identifier 135 or occupancy detector 140. The prioritization selector 110 can include software, switches, comparators, or logical circuits to make a determination of which of a plurality of heat exchangers (such as heat exchangers 155 and 170) to indicate to the controller 105 for operation. The prioritization selector 110 can determine heat exchange prioritization responsive to a determination by at least the scenario identifier 135 or the occupancy detector 140. The prioritization selector 110 can determine, based on the occupancy, a climate control prioritization or a prioritization control setting for one of the cabin 150 or an energy storage system 165 for heat exchange. The climate control prioritization can refer to or include prioritizing one of the first heat exchanger 155 of the second heat exchanger 170 over one another. In some cases, the prioritization selector 110 can determine a prioritization control setting for one of the cabin 150 or the energy storage system 165. The prioritization control setting can indicate which of the first heat exchanger 155 or the second heat exchanger 170 to prioritize over the other.

For example, the prioritization selector 110 can prioritize a first heat exchanger 155 of the cabin 150 responsive to a determination by the occupancy detector 140 that an occupant is within the vehicle. For example, the prioritization selector 110 can prioritize a second heat exchanger 170 of the energy storage system 165 responsive to scenario identifier 135 identifying that a temperature of the energy storage system 165 has exceeded a threshold 120 temperature. For example, the prioritization selector 110 can prioritize a first heat exchanger 155 of the cabin 150 for heat exchange responsive to a detection by the occupancy detector 140 of an occupant in the cabin and a scenario (identified by the scenario identifier 135) corresponding to a request from the occupant to cool the cabin 150 of the vehicle. Prioritization selector 110 can communicate with (for example, via Bluetooth, LAN, or a hardwired connection) a controller 105 of the system 100. In some embodiments, prioritization selector 110 can indicate to the controller 105 to actuate, enable, or operate at least one of the first or second heat exchanger, 155 or 170 respectively. In some embodiments, prioritization selector 110 can include instructions with that indication for operation of the heat exchangers. For example, prioritization selector 110 can indicate to the controller 105 to operate the first heat exchanger 155 for a duration and subsequently operate the second heat exchanger 170 for a duration. For example, prioritization selector 110 can indicate to the controller 105 to operate the second heat exchanger 170 until a threshold temperature is met and subsequently operate the first heat exchanger 155.

Controller 105 can be any device configured to operate a plurality of heat exchangers of a vehicle responsive to an indication from the prioritization selector 110. For example, controller 105 can be a computer, comparator, logic circuit, actuator, or system on a chip (SoC). Controller 105 can control (e.g., actuate, operate, send a signal, activate, initiate) one or more heat exchangers of a vehicle (e.g., first heat exchanger 155 or second heat exchanger 170). Examples of control can include setting a target temperature for a respective heat exchanger, turning a heat exchanger on or off, or adjusting the duty cycle of a heat exchanger. Controller 105 can operate responsive to an indication from the prioritization selector 110. For example, prioritization selector 110 can indicate to the controller 105 to operate a first heat exchanger 155 of the cabin 150. In some embodiments, an indication from prioritization selector 110 can include instructions for operation, such as a target temperature or duty cycle. Controller 105 can operate the first heat exchanger 155, by example, by providing a signal to the first heat exchanger 155 to operate a specific duty cycle or for a specific interval.

Cabin 150 can be a cabin, compartment, room, or enclosure of a vehicle within which an occupant can enter. Cabin 150 can be, for example, the passenger compartment or a cargo area of a vehicle. Cabin 150 can include first heat exchanger 155 and sensors 160. Cabin 150 can be accessed by a door, window, or other entrance or exit of the vehicle. Cabin 150 can contain passengers, such as vehicle occupants or drivers. In some embodiments, passengers can occupy the cabin for an extended period, such as to drive the vehicle. Cabin 150 can include one or more means of user inputs, such as described in FIG. 6. Examples of user input interfaces can include a thermostat to accept user inputs of desired temperature, or a touchscreen display device. User requests can be entered through the user input interface. Cabin 150 can be enclosed as to maintain a stable temperature of the cabin. For example, a temperature can be maintained at 60° F. Maintaining a temperature can refer to holding that temperature within an enclosed space for a duration of time. The temperature of the cabin can fluctuate responsive to at least an egress of the cabin, opening a window, a change in the outside ambient temperature, or a deprioritization of cooling of the cabin 150. Temperature of cabin 150 can fluctuate by example, by an occupant opening a door or window of the cabin to introduce external air flow.

Temperature of cabin 150 can be measured by sensors 160. Sensors 160 can be one or more of any type of sensors to detect, measure, sense, indicate, meter, or count temperature, occupancy, humidity, air content (e.g., $CO_2$ or hydrogen), light (e.g., lumens, lux, or wavelength), air flow, or another environmental feature of the cabin 150. For example, sensors can include temperature sensors such as thermocouples, resistance temperature detectors (RTDs), or thermistors. For example, sensors can include proximity sensors such as infrared (IR) sensors, capacitive proximity sensors, inductive or magnetic proximity sensors. One or more of the sensors 160 can, for example, detect the presence of an occupant of the vehicle. Sensors 160 can be located anywhere within the cabin and can send an indication (e.g., a change in voltage, resistance, capacitance, etc.) to any of the components of the data processing system 180.

First heat exchanger 155 can be any device for heating or cooling the air of the cabin 150. For example, first heat exchanger 155 can include one or many of an evaporator coil, condenser coil, fan, pump, coolant fluid, shell and tube type heat exchanger, plate and frame heat exchanger, or other heat exchanger device known to those in the art. First heat exchanger 155 can be located within any part of the electric vehicle, such as within the cabin itself or within a compartment in the front of the car. First heat exchanger 155 can introduce hotter, cooler, or ambient air into the cabin 150. First heat exchanger 155 can be controlled by controller 105. First heat exchanger 155 can, responsive to an indication from controller 105, operate to cool or heat the air of the cabin. First heat exchanger 155 can operate at any duty cycle and period, such as 100% (e.g., always on), 50% (e.g., on and off equally), or 0% (e.g., off). First heat exchanger 155 can be powered by batteries of the electric vehicle. First heat exchanger 155 can be connected to a series of ducts and fans to propagate airflow throughout the cabin.

Figure 5:
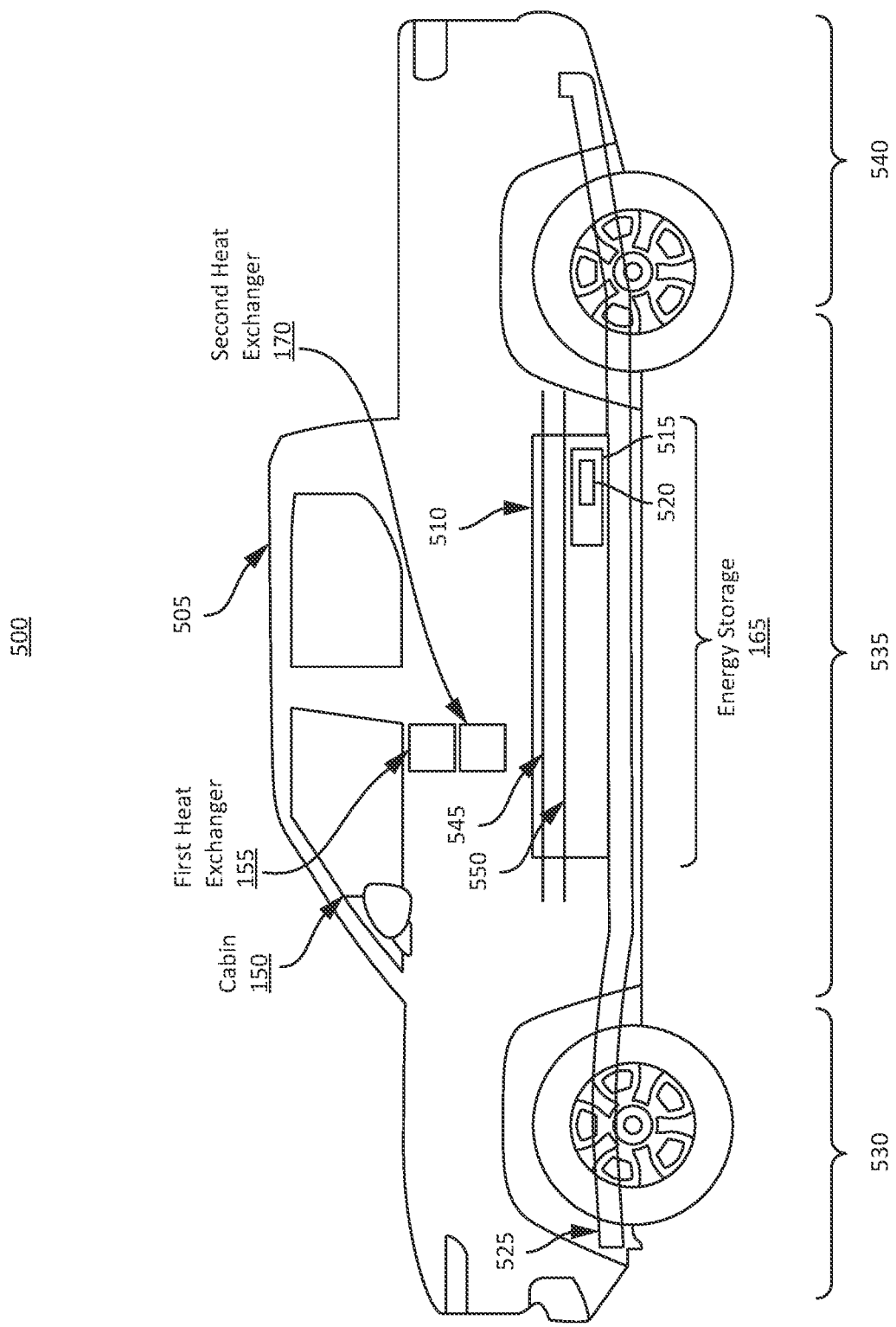
FIG. 5 depicts a cross sectional view of an example electric vehicle.

Energy storage 165 can be any compartment of the vehicle which stores batteries or power equipment of the electric vehicle. Energy storage 165 can include second heat exchanger 170 and sensors 175. Energy storage 165 can include batteries, battery packs, battery modules, or battery cells as depicted in FIG. 5, for example. Energy storage 165 can be enclosed and located anywhere on the electric vehicle, such as on a chassis or front portion of the vehicle. In some embodiments, energy storage 165 may accumulate heat commensurate with the battery modules within the system. In some embodiments, energy storage 165 can require cooling.

Energy storage 165 can include sensors 175. Sensors 175 can be any type of sensors to detect, measure, sense, indicate, meter, or count temperature, occupancy, humidity, air content (such as $CO_2$ or hydrogen), light, or another feature of the energy storage 165. Sensors 175 can include any of the functionalities of sensors 160. For example, sensors can include temperature sensors such as thermocouples, resistance temperature detectors (RTDs), or thermistors. For example, sensors can include proximity sensors such as infrared (IR) sensors, capacitive proximity sensors, inductive or magnetic proximity sensors. The sensors 175 can, for example, detect a temperature of the energy storage 165. Sensors 175 can be located anywhere within the energy storage 165, such as within a battery compartment and can send an indication (e.g., a change in voltage, resistance, capacitance, etc.) to any of the components of the data processing system 180.

Second heat exchanger 170 can be any device for heating or cooling the air of the energy storage 165. For example, second heat exchanger 170 can include one or many of an evaporator coil, condenser coil, fan, pump, coolant fluid, shell and tube type heat exchanger, plate and frame heat exchanger, or other heat exchanger device known to those in the art. Second heat exchanger 170 can include any of the functionalities of first heat exchanger 155. Second heat exchanger 170 can be located within any part of the electric vehicle, such as within the energy storage 165 itself or within a compartment in the front of the car. Second heat exchanger 170 can introduce hotter, cooler, or ambient air than the ambient air in the energy storage 165. Second heat exchanger 170 can be controlled by controller 105. Second heat exchanger 170 can, responsive to an indication from controller 105, operate to cool or heat the air of the energy storage 165. Heat exchanger 170 can operate at any duty cycle and period, such as 100% (e.g., always on), 50% (e.g., on and off equally), or 0% (e.g., off). Second heat exchanger 170 can be powered by batteries of the electric vehicle. Second heat exchanger 170 can be connected to a series of ducts and fans to propagate airflow throughout the cabin.

The network 101 can include any kind of communications link, cables, transmitters, receivers, transceiver, logic circuit, communication chip, communication network (e.g. a local area network ("LAN"), a wide area network ("WAN"), or an inter-network (the internet), cellular network (e.g., 3G, 4G, or 5G)), configured to enable communication, transmission, reception, or connection with the components of the system and with outside systems. The network 101 can be a private network or a public network. Network 101 can enable communication with the data processing system 180 and its subcomponents, the server 145, the first heat exchanger 155, sensors 160, the second heat exchanger 170, and its sensors 175. For example, network 101 can enable the transmission of a signal from the controller 105 to the first or second heat exchanger 155 and 170, respectively.

The server 145 can be any type of device to coordinate the plurality of functionalities of the system 100 over the network 101. The server 145 can be one or many of, for example, a database, an application manager, a gateway server, a VPN, a firewall, a file server, or a computer. In some embodiments, the server 145 may be referred to as a remote machine or a node. The server 145 can be located within the vehicle (e.g., within a dashboard of the vehicle or computer of the vehicle), or in a location remote to the vehicle (e.g., a remote server in a database warehouse, a remote client device). The server 145 can operate according to one or more types of operating systems (e.g., WINDOWS XT, Unix, Linus, MacOS). The server can coordinate and provide functions for the data processing system 180. For example, the server can be configured to perform functions for the controller 105, the occupancy detector 140, or the sensors 160 and 175. The server can operate or include any of the systems of FIG. 6.

The system 100 can include a data processing system 180 including one or more processors coupled with memory (e.g., data repository 115) to detect occupancy (e.g., via occupancy detector 140) of a cabin 150 of a vehicle in a first time interval 125. For example, the occupancy detector 140 can receive an indication from sensors 160 in the cabin 150 that an occupant has entered the vehicle. The data processing system 180 can select, based on the occupancy, one of the cabin 150 or an energy storage system 165 of the vehicle to prioritize for heat exchange in the first time interval. For example, the prioritization selector 110 can choose between the cabin 150 and the energy storage system 165 to prioritize for heat exchange, responsive to the occupancy detector 140 detecting an occupant within the cabin 150. For example, the prioritization selector 110 can prioritize cooling of the cabin 150 in response to an occupant being in the cabin. The data processing system 180 can control (via controller 105) heat exchange for the cabin 150 and the energy storage system 165 in the first time interval 125 based on the prioritization. For example, responsive to a prioritization of the cabin, the controller 105 can send a command to either or both of the first heat exchanger 155 and the second heat exchanger 170 to prioritize heating or cooling of the cabin 150.

The system 100 can include the data processing system 180 further configured to identify (e.g., via scenario identifier 135), for the first time interval 125, a first request to cool the cabin responsive to a first temperature of the cabin 150 exceeding a first temperature set point (e.g., threshold 120) for the cabin. For example, scenario identifier 135 can recognize the temperature of the cabin (detected via sensors 160) exceeds a threshold 120 and identify a corresponding scenario 130. In some implementations, responsive to the temperature of the cabin 150 exceeding a set point (e.g., threshold 120) implemented by the user or system 100, the data processing system 180 can identify, via scenario identifier 135, that the cabin is hotter than the set point. The data processing system 180 can identify, for the first time interval 125, a second request to cool the energy storage system 165 responsive to a second temperature of the energy storage system exceeding a second temperature set point (e.g., threshold) for the energy storage system. For example, scenario identifier 135 can identify that the energy storage system 165 is hotter than the established set point (e.g., threshold 120) through a detection by sensors 175. The set point can be, for example, a threshold temperature at which batteries of the energy storage system 165 can be damaged. In an implementation, the data processing system 180 can monitor if the energy storage system 165 is exceeding a temperature which can be damaging to the energy storage system 165. The data processing system 180 can prioritize (e.g., via prioritization selector 110), responsive to the first request and the second request, and based on the occupancy, the one of the cabin 150 or the energy storage system 165 for heat exchange in the first time interval 125. The prioritization selector 110 can determine, based on the scenarios 130 (determined by the scenario identifier 135) and the occupancy (determined by occupancy detector 140), which compartment of the vehicle to prioritize for cooling.

If, for example, the occupancy detector 140 detects no occupant and the second request to cool the energy storage system 165 is received based on the temperature of the energy storage system 165 exceeding a temperature set point (e.g., threshold 120), the prioritization selector can prioritize cooling of the energy storage system 165. If, for example, the occupancy detector 140 detects an occupant, and the first request to cool the cabin 150 is received based on the temperature of the cabin 150 exceeding a temperature set point, the prioritization selector 110 can prioritize cooling of the cabin 150. If, for example, the occupancy detector 140 detects an occupant, and the first request to cool the cabin 150 is received based on the temperature of the cabin 150 exceeding a temperature set point and also the second request to cool the energy storage system 165 is received based on the temperature of the energy storage system 165 exceeding a temperature set point, the prioritization selector 110 can prioritize cooling of the energy storage system 165.

The data processing system 180 (e.g., via controller 105) can adjust one or more targets for one or more heat exchanges. For example, the data processing system 180 can adjust, based on the prioritization (e.g., determined by prioritization selector 110) of one of the cabin 150 or the energy storage system 165, one or more targets for one or more heat exchangers (e.g., first heat exchanger 155 or second heat exchanger 170) of the vehicle to control heat exchange of the cabin 150 and the energy storage system 165. Targets can include operating parameters of the heat exchangers, such as temperature set point or duty cycle. Controller 105 can adjust the operation of at least one of the first heat exchanger 155 or the second heat exchanger 170. Adjustment of one or more heat exchangers can include modifying, actuating, initiating, or operating of the set temperature, duty cycle, or initiation of a heat exchanger. Adjustment of the heat exchangers 155 and 170 can be in response to the prioritization selector 110 determining a priority for operation of the heat exchangers.

The data processing system 180 (e.g., via occupancy detector 140) can detect, based on data from a proximity sensor located within the cabin (e.g., sensors 160 in cabin 150), that an occupant is in the cabin 150 in the first time interval 125. For example, the occupancy detector 140 can determine that an occupant has entered the cabin 150 from a reading from an IR motion sensor within the cabin 150. The data processing system 180 can prioritize (e.g., via prioritization selector 110), responsive to detection of the occupant in the cabin (e.g., via occupancy detector 140), heat exchange for the cabin 150 over heat exchange for the energy storage system 165 in the first time interval 125. If, for example, an occupant is detected within the cabin 150, the prioritization selector 110 can prioritize cooling the cabin while the occupant is there.

The occupancy information can indicate that the cabin is vacant, in which case the data processing system 180 can prioritize heat exchange (e.g., via prioritization selector 110) of the energy storage system 165 over the cabin 150 responsive to the cabin being vacant. For example, if the occupancy detector 140 determines the cabin 150 to be empty, the prioritization selector 110 can prioritize cooling the energy storage system 165.

The data processing system 180 (e.g., via prioritization selector 110) can prioritize, based on the occupancy indicating the cabin is occupied (e.g., determined by occupancy detector 140), the cabin 150 to cool over the energy storage system 165. For example, if the occupancy detector 140 detects a passenger of the vehicle, it can communicate that to the prioritization selector 110, which in turn can prioritize the cooling of the cabin 150 for the passenger. The data processing system 180 (e.g., via controller 105) can direct, responsive to the prioritization (e.g., by prioritization selector 110), air to the cabin 150 to lower a temperature of the cabin in the first time interval 125. The data processing system 180 can delay, based on the occupancy (e.g., determined by occupancy detector 140), heat exchange for the energy storage system 165 until a second time interval 125 subsequent to the first time interval 125. For example, the controller 105 can direct the first heat exchanger 155 to cool the cabin 150 for an interval 125 of time before directing the second heat exchanger 170 to cool the energy storage system 165.

The data processing system 180 (e.g., via prioritization selector 110) can prioritize, based on the occupancy indicating the cabin is occupied (e.g., via occupancy detector 140), the cabin to cool over the energy storage system 165. The data processing system 180 can delay, based on the occupancy, heat exchange for the energy storage system until a second time interval subsequent to the first time interval in which the cabin is vacant. For example, if during the second time interval the occupancy detector 140 determines the cabin 150 to be vacant, the prioritization selector 110 can direct the controller 105 to switch from cooling via the first heat exchanger 155 to cooling via the second heat exchanger 170.

The data processing system 180 (e.g., via prioritization selector 110) can prioritize, based on the cabin 150 being occupied, the cabin for heat exchange over the energy storage system 165. For example, the prioritization selector 110 can prioritize cooling the cabin 150 instead of the energy storage system 165 if an occupant is detected (via sensors 160) within the cabin 150. Furthermore, the data processing system 180 can determine a temperature of the energy storage system 165 is greater than or equal to a threshold 120 (e.g., via scenario identifier 135). In some embodiments, scenario identifier 135 can detect a temperature of the energy storage system (via sensors 175) and evaluate that temperature (e.g., via a comparator, logic circuit, or computing device of scenario identifier 135) against a threshold 120 temperature to determine which temperature is greater. The data processing system 180 can override the prioritization established (e.g., initially by prioritization selector 110) based on the cabin 150 being occupied to lower the temperature of the energy storage system 165 to below the threshold 120. For example, the prioritization selector 110 can change the priority established during a first time interval 125 to a different priority during a second time interval 125. The prioritization selector 110 can change the priority responsive to a determination by the occupancy detector 140 of the cabin now being empty at or during the second time interval. The data processing system 180 can, for example, prioritize cooling the energy storage 165 if the cabin 150 is empty.

Thus, the data processing system 180 can prioritize cooling the cabin or the battery based on one or more conditions. For example, the data processing system 180 can prioritize cooling the energy storage 165 (e.g., battery) if a temperature of the energy storage 165 exceeds a threshold, regardless of an occupant within the cabin 150. The data processing system 180 can prioritize cooling the cabin 150 occur if an occupant is determined to be within the cabin 150. The data processing system 180 can prioritize cooling the cabin 150 if the temperature of the energy storage 165 is below a threshold temperature, for example.

The data processing system 180 (e.g., via prioritization selector 110) can shift prioritization of heat exchange between the cabin 150 and the energy storage system 165 based on a change in the occupancy for a predetermined duration (e.g., interval 125). For example, prioritization selector 110 can change priority between the first heat exchanger 155 and the second heat exchanger 170 responsive to a change in vehicle occupancy detected by the occupancy detector 140. In some cases, the data processing system 180 can prioritize the cabin 150 for the occupant while they are within the cabin 150.

The data processing system 180 (e.g., via the controller 105 and first heat exchanger 155) can direct air towards a vent in a seat of the vehicle to lower a temperature of the cabin 150. For example, the first heat exchanger 155 can include a vent and a fan configured to direct air towards a seat (e.g., a passenger or driver seat) to cool the cabin 150. The controller 105 can provide instructions to the first and second heat exchangers, 155 and 170 respectively, to operate.

The data processing system 180 can facilitate cooling the cabin 150 in the first time interval 125. The data processing system 180 can detect an egress of an occupant (e.g., by occupancy detector 140) of the vehicle in a second time interval 125 subsequent to the first time interval 125. The vehicle can change to prioritize cooling of the energy storage system 165 if the occupancy detector 140 determines that the occupant has exited the vehicle, for example. The data processing system 180 can cool the energy storage system 165 instead of the cabin 150 in the second time interval 125 responsive to the egress of the occupant from the vehicle in the second time interval 125. The data processing system 180 can detect (via the occupancy detector 140), in a third time interval 125 subsequent to the second time interval, one or more occupants in the cabin. For example, the occupancy detector 140 can detect a driver within the vehicle, and then exiting (e.g., to make a delivery), and then entering the vehicle again, within specified time intervals 125. The data processing system 180 can direct air (e.g., via controller 105) to a seat in the vehicle to cool the cabin 150 instead of the energy storage system 165 in the third time interval 125. The data processing system 180 (e.g., via occupancy detector) can determine that an occupant has re-entered the vehicle and can subsequently change cooling prioritization via the prioritization selector 110.

Figure 2:
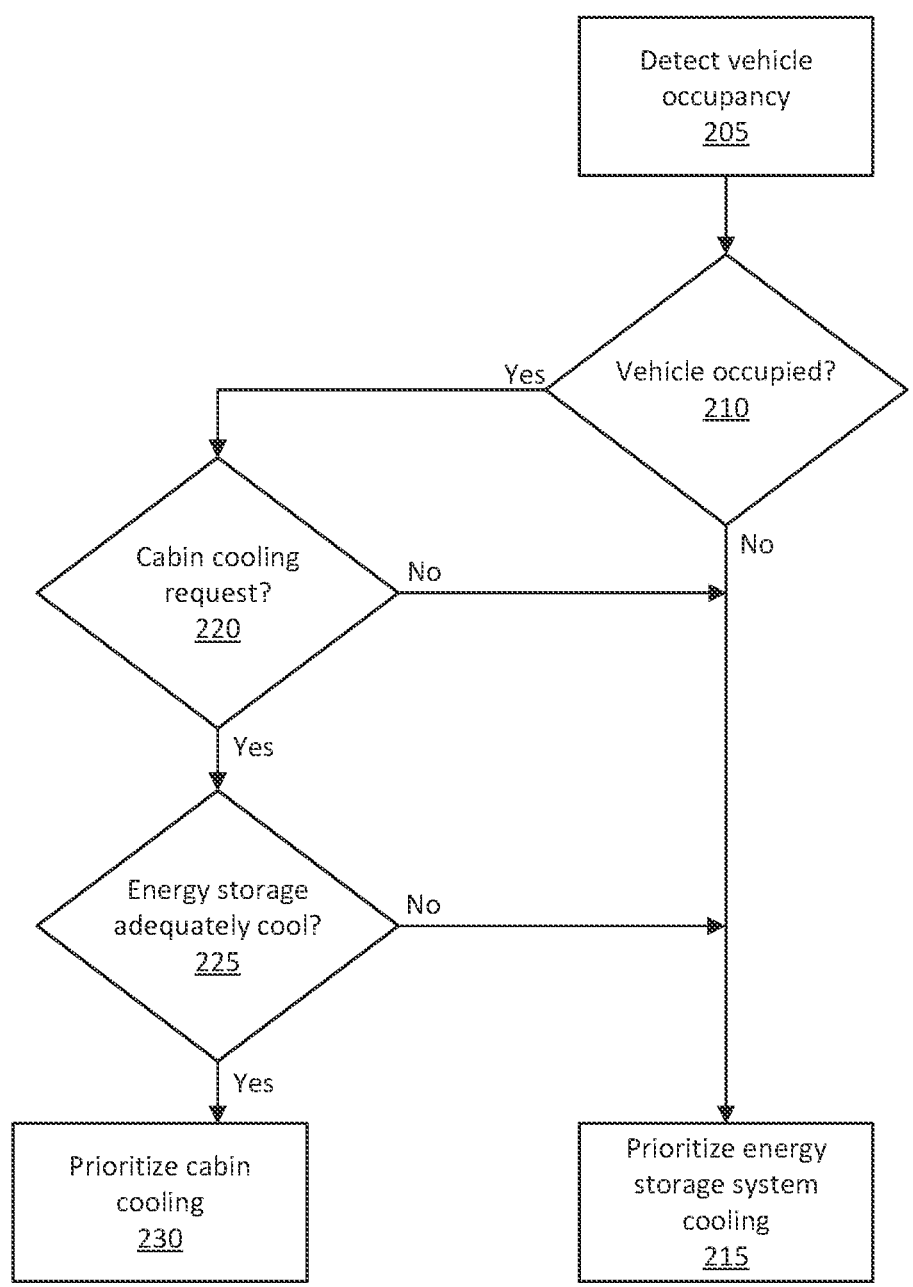
FIG. 2 depicts an example flow chart for determining which vehicle compartment to prioritize for heat exchange.

FIG. 2 depicts an illustrative flow diagram 200 of an example system for prioritizing cabin air flow based at least on vehicle occupancy. The method 200 can be performed by one or more system or component depicted in FIG. 1, FIG. 5 or FIG. 6, including, for example, a data processing system. The method 200 can include, at ACT 205, the data processing system detecting vehicle occupancy. Detecting vehicle occupancy can be accomplished by any one or combination of the sensors 160, occupancy detector 140, or scenario identifier 135. In some embodiments, the one or more sensors (e.g., sensors 160 or 175) can send an indication to the occupancy detector 140 that a passenger is inside the vehicle, outside the vehicle, or has just entered or exited the vehicle. For example, a sensor can be an IR motion sensor which detects the motion of an occupant in the vehicle cabin, or a sensor can be a photodetector which measures the change in light. The sensor can transmit (e.g., via a hardwired line, transmission protocol such as controller area network (CAN), LAN, or Bluetooth) an indication of the occupancy of the vehicle. In some embodiments, act 205 can be responsive to a car door opening, a periodic checking of vehicle occupancy, a change in cabin or energy storage unit temperature, or a person passing nearby the vehicle. Act 205 can lead into act 210.

At ACT 210, the data processing system can determine whether the vehicle is occupied. Vehicle occupancy can be determined responsive to an indication transmitted by at least one sensor of the vehicle to the occupancy detector 140 of the data processing system 180. Occupancy detector 140 can, for example, make a determination of vehicle occupancy. For example, occupancy detector can determine (via the computers, servers, and processing systems associated with FIG. 1 and FIG. 6), based at least on the input from the sensors 160, if the vehicle is occupied. The vehicle being occupied can refer to at least one passenger being or entering into the cabin 150 of the vehicle. Upon a determination of occupancy, the flow can proceed to either act 215 or act 220. Should act 210 determine that the vehicle is not occupied, the flow can proceed to act 215, wherein prioritization of the energy storage system cooling can occur. If act 210 determines the vehicle to be occupied, the flow can proceed to act 220, wherein a cabin cooling request is identified.

At ACT 220, the data processing system can determine whether a request to cool a cabin of the vehicle has been received. A cabin cooling request can be entered by an occupant of the vehicle, remotely via an occupant device (such as an input device 630), or automatically by the vehicle in response to a scheduled cooling session. Inputs can be received by at least a client device, a thermostat of the vehicle, a potentiometer of the vehicle, a display device of the vehicle, or by voice command. A cabin cooling request can indicate a desired temperature or range of temperatures of the cabin, a duration of a specific temperature or range of temperatures, or a time at which to start cooling. A request for cabin cooling can be identified by components of the data processing system 180, such as the scenario identifier 135 or the controller 105. Upon identification of a cabin cooling request, the system can proceed to ACTS 215 or 225. If, however, the data processing system does not identify a cabin cooling request at ACT 220, the data processing system can proceed to ACT 215 at which the data processing system can prioritize cooling the energy storage system. If, at ACT 220, the data processing system identifies a cabin cooling request, the data processing system can proceed to ACT 225.

At ACT 225, the data processing system can determine if the energy storage 165 is being adequately cooled. The data processing system can determine the adequate temperature of the energy storage 165 based on a comparison with a stored value (e.g., threshold 120) in data repository 115. A respective adequate temperature of the energy storage system can correspond to a respective scenario of the plurality of scenarios 130. For example, an adequate temperature may be higher when the ambient temperature of the environment is lower. The determination of whether the energy storage is adequately cooled can be made by components of the data processing system 180, such as the scenario identifier 135. In some embodiments, the scenario identifier 135 can determine if the temperature of the energy storage is adequate in comparison to a stored temperature threshold 120 based on a scenario 130. If the temperature of the storage system is not adequate (e.g., the temperature of the storage system exceeds the threshold temperature), the data processing system can, at ACT 225, determine that the energy storage is not adequately cooled. If the energy storage is not adequately cooled, the data processing system can proceed to ACT 215 and prioritize cooling the energy storage system (e.g., battery). If the data processing system determines the energy storage is adequately cooled, the data processing system can proceed to ACT 230.

At ACT 230, the data processing system can prioritize cooling the cabin. The data processing system can perform ACT 230 responsive to determining that the energy storage system 165 is adequately cooled at ACT 225. Prioritizing cabin cooling can refer to the data processing system directing a finite supply of cooling resources (e.g., such as an air conditioning system of a vehicle, battery resources, or the first or second heat exchangers 155 and 170 respectively) towards the cabin of the vehicle. For example, the maximum amount of air conditioning (via first and second heat exchangers 155 and 170, respectively) can be allotted to the occupied vehicle cabin. Prioritization of cabin cooling can be accomplished by an indication from the controller 105 to one or both of the first and second heat exchangers, 155 and 170 respectively. Prioritization of cabin cooling can be interrupted by at least the energy storage system exceeding a threshold temperature, a passenger entering or exiting the vehicle, or the desired cabin temperature being reached.

At ACT 215, the data processing system can prioritize the energy storage system for cooling. The data processing system can perform ACT 215 to ACT 210, 220, or 225, for example. The data processing system can prioritize cooling of the energy storage system by directing the available cooling resources of the vehicle to the energy storage system. For example, this can include the controller 105 sending an indication to either or both of the first and second heat exchanger to force cool air towards the energy storage system. Prioritization of the energy storage system cooling can be interrupted by at least a determination that the temperature of the energy storage system 165 is below a threshold 120, turning the vehicle off, or a change in scenario.

Figure 3:
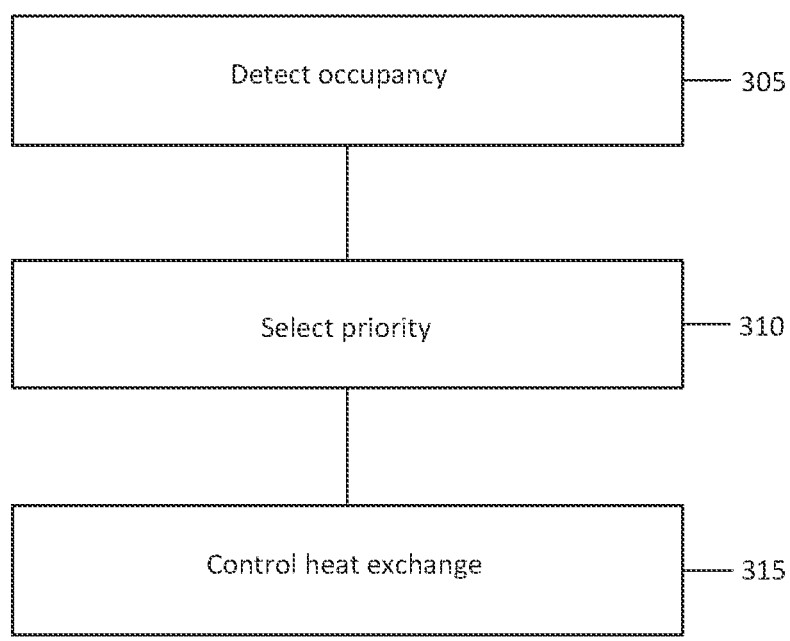
FIG. 3 depicts an example method for heat exchange of a vehicle.

FIG. 3 depicts an example method 300 of a system to detect occupancy of a vehicle and operate a system of the vehicle responsive to the detection. Method flow 300 includes act 305, wherein the occupancy is detected, act 310 wherein priority is selected, and act 315, wherein the heat exchange is controlled. The acts described herein can be configured, acted out, determined, or otherwise implemented by one or more systems or components depicted in FIG. 1, FIG. 5, or FIG. 6, including, for example, a data processing system.

At ACT 305, the data processing system can detect occupancy of the vehicle. Occupancy can be detected by the occupancy detector 140 in response to an occupant entering the vehicle. Detection of occupancy can change dependent upon the entrance or exit of an occupant. The data processing system can detect occupancy of the cabin of the vehicle in a first time interval 125. The data processing system can detect occupancy using a proximity sensor (e.g., sensor 160) located within the cabin 150.

At ACT 310, the data processing system can select a prioritization control setting. The data processing system can select the prioritization control setting responsive to one or more conditions. Conditions can include the occupancy detector 140 detecting an occupant within the vehicle or a detection that a temperature of a vehicle compartment (e.g., cabin 150 or energy storage 165) has exceeded a threshold (e.g., thresholds 120). The prioritization control setting can be dynamic and change contingent upon at least a scenario 130 of the vehicle. The data processing system can prioritize, based on the prioritization control setting, one of the cabin 150 or an energy storage system 165 of the vehicle for heat exchange in the first time interval 125 based on the occupancy (e.g., determined by occupancy detector 140). The prioritization control setting can include, for example, a flag, label, weight, rank, or other field, value or indicator that causes or facilitates prioritizing one heat exchanger of the vehicle over another heat exchanger of the vehicle.

In some cases, the data processing system can identify (via the scenario identifier 135), for the first time interval 125, a first request to cool the cabin 150 responsive to a first temperature of the cabin 150 exceeding a first temperature set point (e.g., threshold 120) for the cabin 150. The data processing system can identify (via the scenario identifier 135), for the first time interval (e.g., of intervals 125), a second request to cool the energy storage system responsive to a second temperature of the energy storage system 165 exceeding a second temperature set point (e.g., threshold 120) for the energy storage system 165. The data processing system can prioritize, responsive to the first request and the second request, and based on the occupancy, the one of the cabin 150 or the energy storage system 165 for heat exchange in the first time interval. For example, the data processing system can select either the first heat exchanger 155 or the second heat exchanger 170 for operation via the controller 105 in the first time interval 125.

The data processing system can prioritize, responsive to detection of the occupant in the cabin (e.g., via occupancy detector 140), heat exchange for the cabin 150 over heat exchange for the energy storage system 165 in the first time interval. The data processing system can select the first heat exchanger 155 for prioritization responsive to a detection of an occupant in the cabin 150 by occupancy detector 140. The data processing system can prioritize heat exchange for the energy storage system 165 over the cabin 150 responsive to the cabin being vacant. For example, prioritization selector 110 can select the second heat exchanger 170 for prioritization responsive to the occupancy detector 140 indicating a vacant cabin 150. The data processing system can prioritize, based on the occupancy indicating the cabin is occupied (e.g., via occupancy detector 140), the cabin 150 to cool over the energy storage system 165. The data processing system can prioritize, based on the occupancy indicating the cabin is occupied (e.g., via occupancy detector 140), the cabin 150 to cool over the energy storage system 165.

At ACT 315, the data processing system can control heat exchange. Heat exchange can be controlled by the controller 105, for example. The controller 105 can instruct at least the first heat exchanger 155 or the second heat exchanger 170 to alter their operation responsive to an indication from the prioritization selector 110. Heat exchange can be caused by at least one of the first heat exchanger 155 (configured to exchange heat within the cabin 150) or the second heat exchanger 170 (configured to exchange heat within the energy storage system 165). The data processing system can control (e.g., via the controller 105) heat exchange for the cabin 150 and the energy storage system 165 in the first time interval 125 based on the prioritization (e.g., as established by prioritization selector 110). The data processing system can adjust, based on the prioritization of one of the cabin 150 or the energy storage system 165, one or more targets (e.g., thresholds 120) for one or more heat exchangers (e.g., first heat exchanger 155 or second heat exchanger 170) of the vehicle to control heat exchange of the cabin 150 and the energy storage system 165. The data processing system can direct, responsive to the prioritization, air to the cabin to lower a temperature of the cabin in the first time interval 125.

In some cases, the data processing system can delay heat exchange. For example, the data processing system can determine the cabin is occupied, and then delay heat exchange of the energy storage system 165 in order to prioritize heat exchange of the cabin. The data processing system can delay heat exchange for the energy storage system 165 until a second time interval 125 subsequent to the first time interval. In some cases, the data processing system can delay, based on the occupancy (e.g., as determined by occupancy detector 140), heat exchange for the energy storage system 165 until a second time interval subsequent to the first time interval in which the cabin 150 is vacant.

Figure 4:
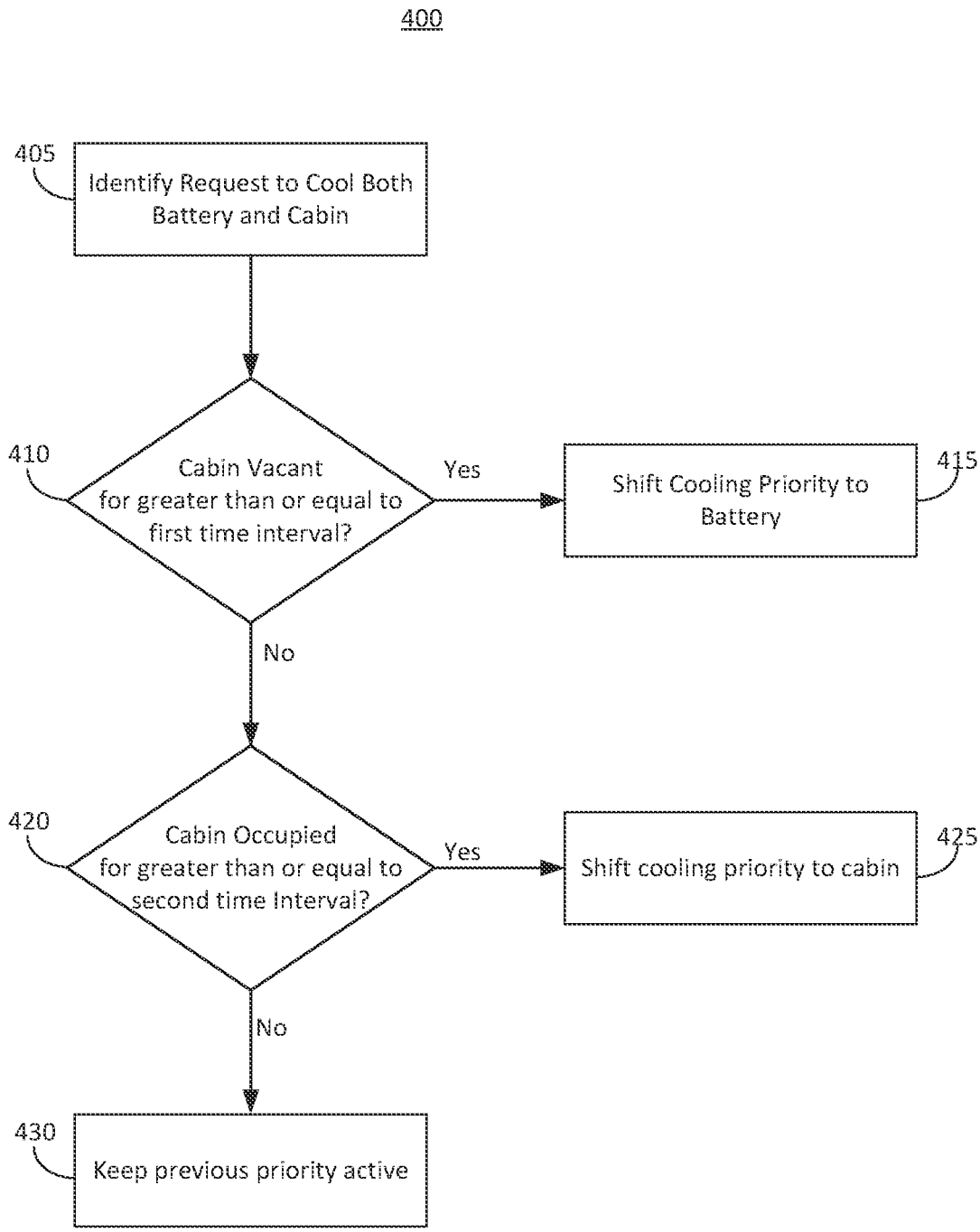
FIG. 4 depicts an example method for heat exchange of a vehicle.

FIG. 4 depicts an example method for heat exchange of a vehicle. The method 400 can be performed by one or more system or component depicted in FIG. 1, FIG. 5, or FIG. 6, including, for example a data processing system. At ACT 405, the data processing system can identify or receive a request to cool both a battery of a vehicle and a cabin of the vehicle. For example, the data processing system can determine, via sensor data, that the temperature of a battery of the vehicle is greater than a temperature set point and that the temperature of the cabin of the vehicle is greater than a second temperature set point. The data processing system can determine that since the temperatures of the cabin and the battery are greater than the respective set points, to cool both the battery and the cabin. An example cabin temperature set point can be 68 degrees Fahrenheit ("F"), 70 degrees F., 71 degrees F., 72 degrees F., 75 degrees F., or other cabin temperature (e.g., in the range of 60 degrees F. to 80 degrees F.). The cabin temperature set point can be set by a driver or passenger of the cabin, or can be a default value. The battery temperature set point can be 60 degrees F., 65 degrees F., 70 degrees F., 75 degrees F., 80 degrees F., or other battery temperature (e.g., in the range of 60 degrees F. to 90 degrees F.).

At decision block 410, the data processing system can determine that the cabin has been vacant for greater than or equal to a first time interval. The first time interval can refer to a duration of time, such as 2 seconds, 3 seconds, 4 seconds, 5 seconds, 6 seconds, or other duration or amount of time. The data processing system can use an occupancy detector (e.g., a seat pressure sensor or proximity sensor) to determine whether the cabin of the vehicle is currently vacant (e.g., there is no driver and no passengers in the vehicle). Upon detecting that the cabin of the vehicle is vacant, the data processing system can start, initiate, activate or otherwise begin a timer or counter to determine the duration of time for which the cabin has been vacant. If, at decision block 410, the data processing system determines that the cabin of the vehicle has been vacant for greater than or equal to the first time interval (e.g., 3 seconds), then the data processing system can proceed to ACT 415.

At ACT 415, the data processing system can shift cooling priority to the battery. For example, responsive to a request to cool both the battery and the cabin identified at ACT 405 and a determination that the cabin has been vacant for more than seconds at decision block 410, the data processing system can determine to prioritize cooling the battery at ACT 415. The data processing system can determine to prioritize cooling the battery because the cabin has been vacant for more than the first time interval (e.g., 3 second). Shifting cooling priority to the battery can refer to or include cooling only the battery without providing any cooling to the cabin, or providing more cooling to the battery relative to the cabin.

If, however, the data processing system determines, at decision block 410, that the cabin has been vacant for less than the first time interval (e.g., 3 seconds), then the data processing system can proceed to decision block 420. At decision block 420, the data processing system can determine whether the cabin has been occupied for greater than or equal to a second time interval or duration of time (e.g., 0.5 seconds, 1 seconds, 1.5 seconds, 2 seconds, 3 seconds or other time interval). The second time interval can be different than the first time interval. The second time interval can be less than the first time interval. For example, the first time interval can be 3 seconds, and the second time interval can be 0.5 seconds.

The data processing system can determine that the cabin is occupied based on data or an indication from a pressure or weight sensor located under a seat of the vehicle. The data processing system can determine that the cabin is occupied based on data or an indication from a proximity sensor (e.g., infrared sensor, transducer, motion sensor) in the cabin. Upon detecting that the cabin is occupied (e.g., either by a driver or passenger), the data processing system can initiate or begin a timer or counter. If the data processing system determines that the cabin has been occupied for greater than or equal to the second time interval (e.g., 0.5 second), then the data processing system can proceed to ACT 425.

At ACT 425, the data processing system can shift cooling priority to the cabin. For example, the data processing system can determine to cool only the cabin without providing any cooling to the battery, or the data processing system can determine to providing more cooling to the cabin relative to the battery.

If, however, at decision block 420 the data processing system determines that the cabin has been occupied for less than the second time interval (e.g., less than 0.5 second), then the data processing system can proceed to ACT 430. At ACT 430, the data processing system can maintain, keep or not change the previously set or established priority. The data processing system can keep cooling priority between the cabin and the battery the same if the data processing system determines that the cabin has not been occupied for less than the second time interval. For example, at ACT 405, the data processing system may have a default priority or previously set or established priority. The default priority can be to prioritize cooling the battery over the cabin such that the temperature of the battery is maintain less than the battery temperature set point. If the data processing system, via method 400, arrives at ACT 430, the data processing system can continue to prioritize cooling the battery over the cabin. If, however, the data processing system, via method 400, arrives at 425, the data processing system can shift cooling priority to the cabin.

FIG. 5 depicts an example cross-sectional view 500 of an electric vehicle 505 installed with at least one battery pack 510. Electric vehicles 505 can include electric delivery vehicles, electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 510 can also be used as an energy storage system to power a building, such as a residential home or commercial building. Electric vehicles 505 can be fully electric or partially electric (e.g., plug-in hybrid) and further, electric vehicles 505 can be fully autonomous, partially autonomous, or unmanned. Electric vehicles 505 can also be human operated or non-autonomous. Electric vehicles 505 such as electric trucks or automobiles can include on-board battery packs 510, batteries 515 or battery modules 515, or battery cells 520 to power the electric vehicles. The electric vehicle 505 can include a chassis 525 (e.g., a frame, internal frame, or support structure). The chassis 525 can support various components of the electric vehicle 505. The chassis 525 can span a front portion 530 (e.g., a hood or bonnet portion), a body portion 535, and a rear portion 540 (e.g., a trunk, payload, or boot portion) of the electric vehicle 505. The battery pack 510 can be installed or placed within the electric vehicle 505. For example, the battery pack 510 can be installed on the chassis 525 of the electric vehicle 505 within one or more of the front portion 530, the body portion 535, or the rear portion 540. The battery pack 510 can include or connect with at least one busbar, e.g., a current collector element. For example, the first busbar 545 and the second busbar 550 can include electrically conductive material to connect or otherwise electrically couple the battery 515, the battery modules 515, or the battery cells 520 with other electrical components of the electric vehicle 505 to provide electrical power to various systems or components of the electric vehicle 505. Energy storage 165 can include first busbar 545, second busbar 550, battery pack 510, batteries 515 or battery modules 515, or battery cells 520.

An electric delivery vehicle 505 can include a proximity sensor to detect occupancy of a cabin (such as within front portion 530, body portion 535, or rear portion 540) of the electric delivery vehicle. The proximity sensor can be such that it can detect entrance, exit, or continuous occupation of the vehicle by an occupant. The electric delivery vehicle 505 can include an energy storage system (e.g., energy storage 165), a first heat exchanger configured to exchange heat with the cabin, and a second heat exchanger configured to exchange heat with the energy storage system. The first heat exchanger can be heat exchanger 155 and the second heat exchanger can be heat exchanger 170. The electric delivery vehicle 505 can include a data processing system including one or more processors coupled with memory to detect, via the proximity sensor, the occupancy of the cabin in a first time interval. The data processing system can be data processing system 180. The electric delivery vehicle 505 can include data processing system 180 including one or more processors coupled with memory to select, based on the occupancy, one of the cabin or an energy storage system of the vehicle to prioritize for heat exchange in the first time interval. The electric delivery vehicle 505 can include data processing system 180 including one or more processors coupled with memory to adjust, based on the prioritization, a first target for the first heat exchanger and a second target for the second heat exchanger to control heat exchange for the cabin and the energy storage system in the first time interval.

The electric delivery vehicle 505 can include the data processing system, further configured to identify, for the first time interval, a first request to cool the cabin responsive to a first temperature of the cabin exceeding a first temperature set point for the cabin 150. The data processing system can identify, for the first time interval, a second request to cool the energy storage system responsive to a second temperature of the energy storage system 165 exceeding a second temperature set point for the energy storage system 165. The data processing system 180 of electric delivery vehicle 505 can prioritize, responsive to the first request and the second request, and based on the occupancy, the one of the cabin 150 or the energy storage system 165 for heat exchange in the first time interval.

Figure 6:
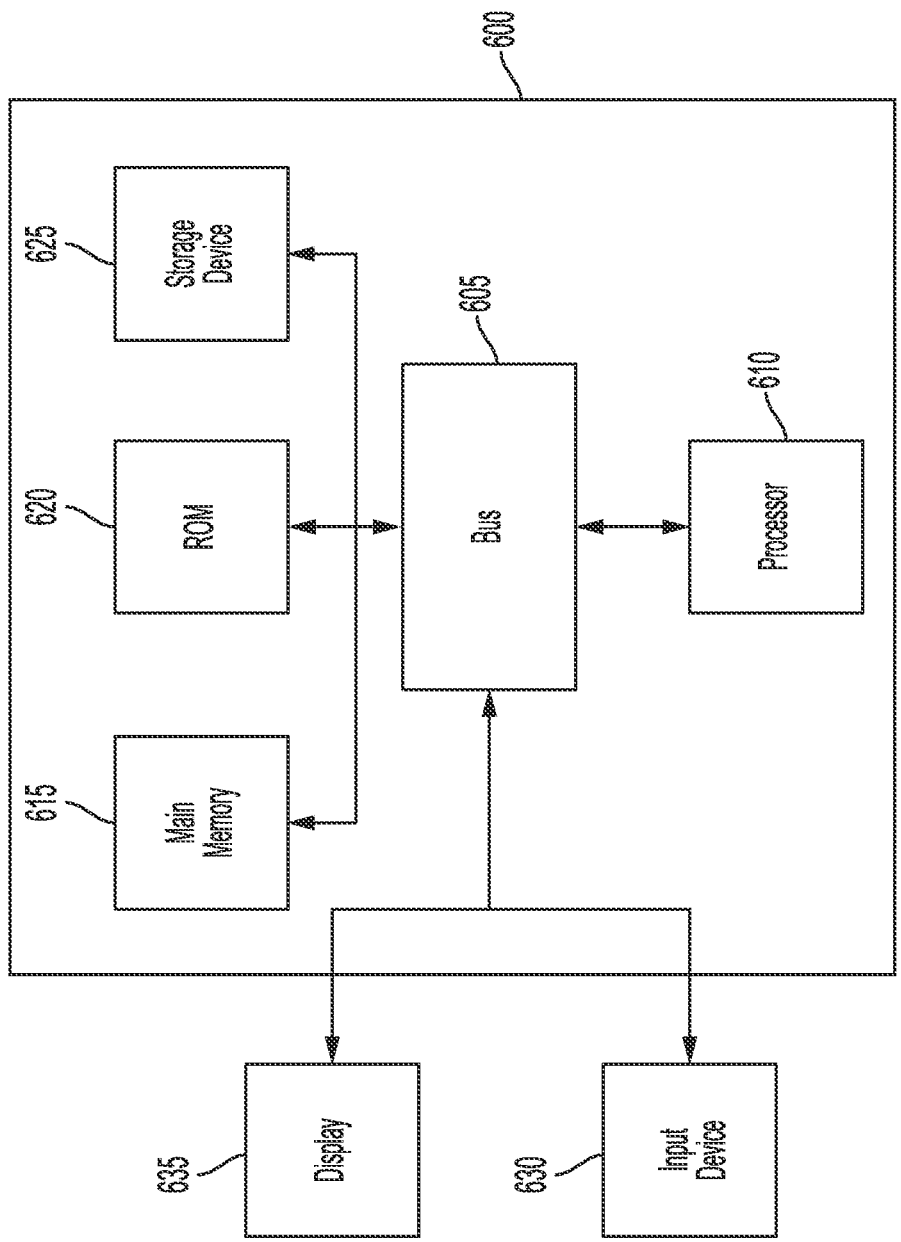
FIG. 6 is a block diagram illustrating an architecture for a computer system that can be employed to implement elements of the systems and methods described and illustrated herein.

FIG. 6 depicts an example block diagram of an example computer system 600. The computer system or computing device 600 can include or be used to implement a data processing system or its components. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can be used for storing information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions.

The computing system 600 may be coupled via the bus 605 to a display 635, such as a liquid crystal display, or active matrix display, for displaying information to a user such as a driver of the electric vehicle 505 or other end user. An input device 630, such as a keyboard or voice interface may be coupled to the bus 605 for communicating information and commands to the processor 610. The input device 630 can include a touch screen display 635. The input device 630 can include a thermostat or a touchscreen device. The input device 630 can include a cursor control, such as a mouse, a trackball, or cursor direction keys, for communicating direction information and command selections to the processor 610 and for controlling cursor movement on the display 635. The input device 630 can accept a user input to create a temperature set point (e.g., threshold 120).

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a data processing system comprising one or more processors coupled with memory, the data processing system configured to:
detect occupancy of a cabin of a vehicle during a first time interval;
determine, based on the occupancy, a climate control prioritization for one of the cabin or an energy storage system of the vehicle for heat exchange; and
control heat exchange for the cabin and the energy storage system based on the determined climate control prioritization.

2. The system of claim 1, wherein the data processing system is further configured to:
identify, for the first time interval, a first request to cool the cabin responsive to a first temperature of the cabin exceeding a first temperature set point for the cabin;
identify, for the first time interval, a second request to cool the energy storage system responsive to a second temperature of the energy storage system exceeding a second temperature set point for the energy storage system; and
prioritize, responsive to the first request and the second request, and based on the occupancy, one of the cabin or the energy storage system for heat exchange in the first time interval.

3. The system of claim 1, wherein the data processing system is further configured to:
adjust, based on prioritization of one of the cabin or the energy storage system, one or more targets for one or more heat exchangers of the vehicle to control heat exchange of the cabin and the energy storage system.

4. The system of claim 1, wherein the data processing system is further configured to:
detect, based on data from a proximity sensor located within the cabin, that an occupant is in the cabin in the first time interval; and
prioritize, responsive to detection of the occupant in the cabin, heat exchange for the cabin over heat exchange for the energy storage system in the first time interval.

5. The system of claim 1, wherein when the occupancy indicates that the cabin is vacant, the data processing system is further configured to:
prioritize heat exchange for the energy storage system over the cabin responsive to the cabin being vacant.

6. The system of claim 1, wherein the data processing system is further configured to:
prioritize, based on the occupancy indicating the cabin is occupied, the cabin to cool over the energy storage system;
direct, responsive to prioritization, air to the cabin to lower a temperature of the cabin in the first time interval; and
delay, based on the occupancy, heat exchange for the energy storage system until a second time interval subsequent to the first time interval.

7. The system of claim 1, wherein the data processing system is further configured to:
prioritize, based on the occupancy indicating the cabin is occupied, the cabin to cool over the energy storage system; and
delay, based on the occupancy, heat exchange for the energy storage system until a second time interval subsequent to the first time interval in which the cabin is vacant.

8. The system of claim 1, wherein the data processing system is further configured to:
prioritize, based on the cabin being occupied, the cabin for heat exchange over the energy storage system;
determine a temperature of the energy storage system is greater than or equal to a threshold; and
override prioritization established based on the cabin being occupied to lower the temperature of the energy storage system to below the threshold.

9. The system of claim 1, wherein the data processing system is further configured to:
shift prioritization of heat exchange between the cabin and the energy storage system based on a change in the occupancy for a predetermined duration.

10. The system of claim 1, wherein the data processing system is further configured to:
direct air towards a vent in a seat of the vehicle to lower a temperature of the cabin.

11. The system of claim 1, wherein the data processing system is further configured to:
cool the cabin in the first time interval;
detect an exit of an occupant of the vehicle in a second time interval subsequent to the first time interval;
cool the energy storage system instead of the cabin in the second time interval responsive to the exit of the occupant from the vehicle in the second time interval;
detect, in a third time interval subsequent to the second time interval, one or more occupant in the cabin; and
direct air to a seat in the vehicle to cool the cabin instead of the energy storage system in the third time interval.

12. A method, comprising:
detecting, by a data processing system comprising one or more processors coupled with memory, occupancy of a cabin of a vehicle during a first time interval;
selecting, by the data processing system based on the occupancy, a prioritization control setting for one of the cabin or an energy storage system of the vehicle to prioritize for heat exchange; and controlling, by the data processing system, heat exchange for the cabin and the energy storage system based on the prioritization control setting.

13. The method of claim 12, comprising:
adjusting, by the data processing system based on prioritization of one of the cabin or the energy storage system, one or more targets for one or more heat exchangers of the vehicle to control heat exchange of the cabin and the energy storage system.

14. The method of claim 12, comprising:
identifying, by the data processing system for the first time interval, a first request to cool the cabin responsive to a first temperature of the cabin exceeding a first temperature set point for the cabin;
identifying, by the data processing system for the first time interval, a second request to cool the energy storage system responsive to a second temperature of the energy storage system exceeding a second temperature set point for the energy storage system; and
prioritizing, by the data processing system responsive to the first request and the second request, and based on the occupancy, one of the cabin or the energy storage system for heat exchange in the first time interval.

15. The method of claim 12, comprising:
detecting, by the data processing system based on data from a proximity sensor located within the cabin, that an occupant is in the cabin in the first time interval; and
prioritizing, by the data processing system responsive to detection of the occupant in the cabin, heat exchange for the cabin over heat exchange for the energy storage system in the first time interval.

16. The method of claim 12, wherein the occupancy indicates that the cabin is vacant, comprising:
prioritizing, by the data processing system, heat exchange for the energy storage system over the cabin responsive to the cabin being vacant.

17. The method of claim 12, comprising:
prioritizing, by the data processing system based on the occupancy indicating the cabin is occupied, the cabin to cool over the energy storage system;
directing, by the data processing system responsive to prioritizing the cabin, air to the cabin to lower a temperature of the cabin in the first time interval; and
delaying, by the data processing system based on the occupancy, heat exchange for the energy storage system until a second time interval subsequent to the first time interval.

18. The method of claim 12, comprising:
prioritizing, by the data processing system based on the occupancy indicating the cabin is occupied, the cabin to cool over the energy storage system; and
delaying, by the data processing system based on the occupancy, heat exchange for the energy storage system until a second time interval subsequent to the first time interval in which the cabin is vacant.

19. An electric delivery vehicle, comprising:
a proximity sensor to detect occupancy of a cabin of the electric delivery vehicle;
an energy storage system;
a first heat exchanger configured to exchange heat with the cabin;
a second heat exchanger configured to exchange heat with the energy storage system; and
a data processing system comprising one or more processors coupled with memory to:
detect, via the proximity sensor, the occupancy of the cabin in a first time interval;
determine, based on the occupancy, a climate control prioritization for one of the cabin or the energy storage system for heat exchange in the first time interval; and
adjust, based on the climate control prioritization, a first target for the first heat exchanger and a second target for the second heat exchanger to control heat exchange for the cabin and the energy storage system.

20. The electric delivery vehicle of claim 19, wherein the data processing system is further configured to:
identify, for the first time interval, a first request to cool the cabin responsive to a first temperature of the cabin exceeding a first temperature set point for the cabin;
identify, for the first time interval, a second request to cool the energy storage system responsive to a second temperature of the energy storage system exceeding a second temperature set point for the energy storage system; and
prioritize, responsive to the first request and the second request, and based on the occupancy, one of the cabin or the energy storage system for heat exchange in the first time interval.

* * * * *